US012452846B2

(12) United States Patent
Huang et al.

(10) Patent No.: US 12,452,846 B2
(45) Date of Patent: Oct. 21, 2025

(54) TECHNIQUES AND APPARATUSES FOR CONFIGURING A COMMON UPLINK PORTION IN NEW RADIO

(71) Applicant: QUALCOMM Incorporated, San Diego, CA (US)

(72) Inventors: Yi Huang, San Diego, CA (US); Wanshi Chen, San Diego, CA (US); Wei Zeng, San Diego, CA (US); Hao Xu, Beijing (CN); Renqiu Wang, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 391 days.

(21) Appl. No.: 15/806,814

(22) Filed: Nov. 8, 2017

(65) Prior Publication Data
US 2018/0132244 A1 May 10, 2018

Related U.S. Application Data

(60) Provisional application No. 62/420,390, filed on Nov. 10, 2016.

(51) Int. Cl.
*H04W 72/00* (2023.01)
*H04L 5/00* (2006.01)
(Continued)

(52) U.S. Cl.
CPC ....... *H04W 72/0453* (2013.01); *H04L 5/0094* (2013.01); *H04W 72/23* (2023.01); *H04L 5/0048* (2013.01); *H04L 5/0053* (2013.01)

(58) Field of Classification Search
CPC ............ H04W 72/0453; H04W 72/042; H04L 5/0094; H04L 5/0048; H04L 5/0053
See application file for complete search history.

(56) References Cited

U.S. PATENT DOCUMENTS 8,483,041 B2 7/2013 Lee et al.
8,917,605 B2 * 12/2014 Pelletier .............. H04W 52/365
370/236
(Continued)

FOREIGN PATENT DOCUMENTS

CN 101404636 A 4/2009
CN 101617480 A 12/2009
(Continued)

OTHER PUBLICATIONS

International Search Report and Written Opinion—PCT/US2017/060902—ISA/EPO—Jan. 22, 2018.
(Continued)

*Primary Examiner* — Abdelillah Elmejjarmi
(74) *Attorney, Agent, or Firm* — Harrity & Harrity, LLP

(57) ABSTRACT

A method, an apparatus, and a computer program product for wireless communication are provided. The apparatus may receive a configuration indication for a common uplink portion of a wireless communication structure. The apparatus may configure the common uplink portion based at least in part on the configuration indication. The apparatus may transmit a communication in the common uplink portion configured according to the configuration indication.

32 Claims, 13 Drawing Sheets

(51) Int. Cl.
*H04W 72/0453* (2023.01)
*H04W 72/23* (2023.01)

(56) References Cited

U.S. PATENT DOCUMENTS

| | | | |
|---|---|---|---|
| 2011/0013613 A1* | 1/2011 | Sung | H04L 1/1887 370/338 |
| 2011/0051666 A1 | 3/2011 | Kim et al. | |
| 2012/0033588 A1* | 2/2012 | Chung | H04L 1/1812 370/280 |
| 2013/0223298 A1* | 8/2013 | Ahn | H04L 1/1854 370/280 |
| 2014/0003349 A1* | 1/2014 | Kang | H04L 1/0046 370/328 |
| 2014/0080509 A1* | 3/2014 | Siomina | G01S 5/10 455/456.1 |
| 2014/0247758 A1* | 9/2014 | Li | H04L 5/0096 370/280 |
| 2015/0055570 A1* | 2/2015 | Viorel | H04W 72/04 370/329 |
| 2016/0021655 A1* | 1/2016 | Seo | H04L 1/1829 370/280 |
| 2016/0043849 A1* | 2/2016 | Lee | H04L 5/0053 370/329 |
| 2017/0311326 A1* | 10/2017 | Wong | H04W 72/0453 |
| 2017/0325049 A1* | 11/2017 | Basu Mallick | H04W 4/70 |
| 2017/0331670 A1* | 11/2017 | Parkvall | H04L 41/0816 |
| 2017/0346604 A1* | 11/2017 | Qu | H04L 5/1469 |
| 2018/0124715 A1* | 5/2018 | Xu | H04W 52/146 |
| 2018/0332610 A1* | 11/2018 | Xia | H04W 48/12 |
| 2019/0069312 A1* | 2/2019 | Oh | H04L 5/0053 |
| 2019/0215828 A1* | 7/2019 | Kim | H04W 72/0426 |
| 2020/0314840 A1* | 10/2020 | Golitschek Edler Von Elbwart | H04W 72/0446 |
| 2021/0084578 A1* | 3/2021 | Ingale | H04W 72/23 |

FOREIGN PATENT DOCUMENTS

| | | |
|---|---|---|
| CN | 101978636 A | 2/2011 |
| CN | 103460788 A | 12/2013 |
| CN | 103503349 A | 1/2014 |
| EP | 2765801 A1 | 8/2014 |
| EP | 2813122 A1 | 12/2014 |
| JP | 2016514910 A | 5/2016 |
| JP | WO2018030416 A1 | 6/2019 |
| WO | 2009116790 A2 | 9/2009 |
| WO | 2009155210 A1 | 12/2009 |
| WO | 2011063244 A2 | 5/2011 |
| WO | 2012148207 A2 | 11/2012 |
| WO | 2016064544 A1 | 4/2016 |
| WO | 2017106025 A1 | 6/2017 |

OTHER PUBLICATIONS

Qualcomm Incorporated: "UL Channelization in Short UL Duration", 3GPP Draft; R1-1612073, 3rd Generation Partnership Project (3GPP), Mobile Competence Centre; 650, Route Des Lucioles; F-06921 Sophia-Antipolis Cedex; France, vol. RAN WG1, No. Reno, U.S.A; Nov. 5, 2016, XP051190671, Retrieved from the Internet: URL:http://www.3gpp.org/ftp/tsg_ran/WG1_RL1/TSGR1_87/Docs/ [retrieved on Nov. 5, 2016], 8 pages.

Huawei, et al., "Discussion on Enhanced Frame Structure for Latency Reduction in TDD", 3GPP TSG RAN WG1 Meeting #84b, R1-162116, 3rd Generation Partnership Project (3GPP), Mobile Competence Centre, 650, Route Des Lucioles, F-06921 Sophia-Antipolis Cedex, France, vol. RAN WG1, No. Busan, Korea, Apr. 11, 2016-Apr. 15, 2016, Apr. 2, 2016 (Apr. 2, 2016), XP051079963, 7 Pages, Retrieved from the Internet: URL: http://www.3gpp.org/ftp/tsg_ran/WG1_RL1/TSGR1_84b/Doc/ [retrieved on Apr. 2, 2016].

Nokia, et al., "On the Mini-Slot Structures in NR", 3GPP TSG-RAN WG1 #87, R1-1612262, Reno, USA, Nov. 14-18, 2016, 5 Pages.

Qualcomm Incorporated: "UL Processing Time Considerations", 3GPP TSG-RAN WG1 #87, R1-1612078, Reno, Nevada, U.S.A., Nov. 14-18, 2016, 6 Pages.

Mediatek Inc: "DL Control Channel Design for NR", 3GPP TSG RAN WG1 Meeting #87, R1-1612120, 3rd Generation Partnership Project, Mobile Competence Centre, 650, Route Des Lucioles, F-86921, Sophia-Antipolis Cedex, France, vol. RAN WG1, No. Reno, USA, Nov. 14, 2016-Nov. 18, 2016, XP051176075, Nov. 5, 2016, 4 Pages.

* cited by examiner

Parameters for configuring common UL portion

| Configuration Index | 0 | 1 | 2 | 3 | 4 | 5 | ... | N |
|---|---|---|---|---|---|---|---|---|
| Waveform | SC-FDM | OFDM | SC-FDM | OFDM | SC-FDM | OFDM | ... | OFDM |
| Timing (slot to be configured) | Current slot | Current slot | Current slot | Current slot | 1 slot away | 2 slots away | ... | L slots away |
| Sub-carrier spacing | 15Khz | 30Khz | 30Khz | 30Khz | 60Khz | 120Khz | ... | 120Khz |
| Length (number of symbols) | 1 symbol | 1 symbol | 2 symbols | 2 symbols | 3 symbols | 4 symbols | ... | All symbols in a slot |
| Frequency (set of RBs) | RB0-RB100 | RB0-RB100 | RB0-RB100 | RB50-RB150 | RB100-RB200 | RB100-RB200 | ... | All RBs in the bandwidth |

Cell-specific parameters for configuring common UL portion

| Configuration Index | 0 | 1 | 2 | 3 | 4 | 5 | ... | N |
|---|---|---|---|---|---|---|---|---|
| Timing (slot to be configured) | Current slot | Current slot | Current slot | Current slot | 1 slot away | 2 slots away | ... | L slots away |
| Sub-carrier spacing | 15Khz | 30Khz | 30Khz | 30Khz | 60Khz | 120Khz | ... | 120Khz |
| Length (number of symbols) | 1 symbol | 1 symbol | 2 symbols | 2 symbols | 3 symbols | 4 symbols | ... | All symbols in a slot |

1120

UE-specific parameters for configuring common UL portion

| Configuration Index | 0 | 1 | 2 | 3 | 4 | 5 | ... | N |
|---|---|---|---|---|---|---|---|---|
| Waveform | SC-FDM | OFDM | SC-FDM | OFDM | SC-FDM | OFDM | ... | OFDM |
| Frequency (set of RBs) | RB0-RB100 | RB0-RB100 | RB0-RB100 | RB50-RB150 | RB100-RB200 | RB100-RB200 | ... | All RBs in the bandwidth |

FIG. 11

TECHNIQUES AND APPARATUSES FOR CONFIGURING A COMMON UPLINK PORTION IN NEW RADIO

CROSS-REFERENCE TO RELATED APPLICATIONS UNDER 35 U.S.C. § 119

This application claims priority to Provisional Patent Application No. 62/420,390, filed on Nov. 10, 2016, entitled "TECHNIQUES AND APPARATUSES FOR CONFIGURING A COMMON UPLINK PORTION IN NEW RADIO," which is hereby expressly incorporated by reference herein.

BACKGROUND

Field

Aspects of the present disclosure generally relate to wireless communication, and more particularly to techniques and apparatuses for configuring a common uplink portion in New Radio.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different wireless communication devices to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In an aspect of the disclosure, a method, an apparatus, and a computer program product are provided.

In some aspects, the method may include receiving, by a user equipment (UE), a configuration indication for a common uplink portion of a wireless communication structure. The method may include configuring, by the UE, the common uplink portion based at least in part on the configuration indication. The method may include transmitting, by the UE, a communication in the common uplink portion configured according to the configuration indication.

In some aspects, the apparatus may include a memory and at least one processor coupled to the memory. The at least one processor may be configured to receive a configuration indication for a common uplink portion of a wireless communication structure. The at least one processor may be configured to configure the common uplink portion based at least in part on the configuration indication. The at least one processor may be configured to transmit a communication in the common uplink portion configured according to the configuration indication.

In some aspects, the apparatus may include means for receiving a configuration indication for a common uplink portion of a wireless communication structure. The apparatus may include means for configuring the common uplink portion based at least in part on the configuration indication. The apparatus may include means for transmitting a communication in the common uplink portion configured according to the configuration indication.

In some aspects, the computer program product may include a non-transitory computer-readable medium storing computer executable code. The code may include code for receiving a configuration indication for a common uplink portion of a wireless communication structure. The code may include code for configuring the common uplink portion based at least in part on the configuration indication. The code may include code for transmitting a communication in the common uplink portion configured according to the configuration indication.

Aspects generally include a method, apparatus, system, computer program product, non-transitory computer-readable medium, user equipment, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

FIGS. 9-11 are diagrams illustrating examples of configuring a common uplink portion of a wireless communication structure in New Radio.

DETAILED DESCRIPTION

Figure 1:
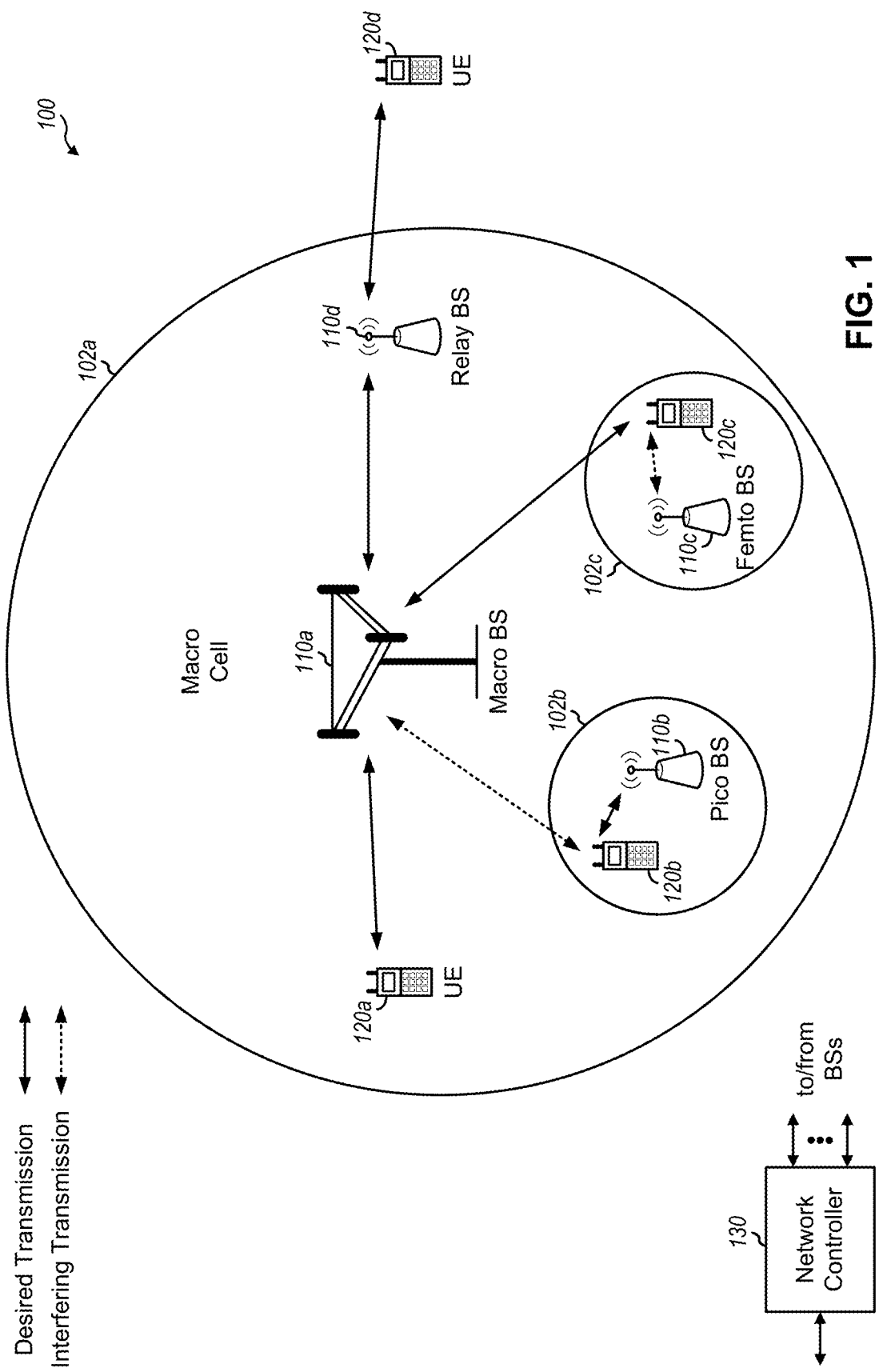
FIG. 1 is diagraml illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

An access point ("AP") may comprise, be implemented as, or known as a NodeB, a Radio Network Controller ("RNC"), an eNodeB (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), a Node B (NB), a gNB, a 5G NB, a NR BS, a Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, etc.), medical devices or equipment, biometric sensors/devices, an entertainment device (e.g., music device, video device, satellite radio, gaming device, etc.), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, etc. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G NB, an access point, a TRP, etc. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE).

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
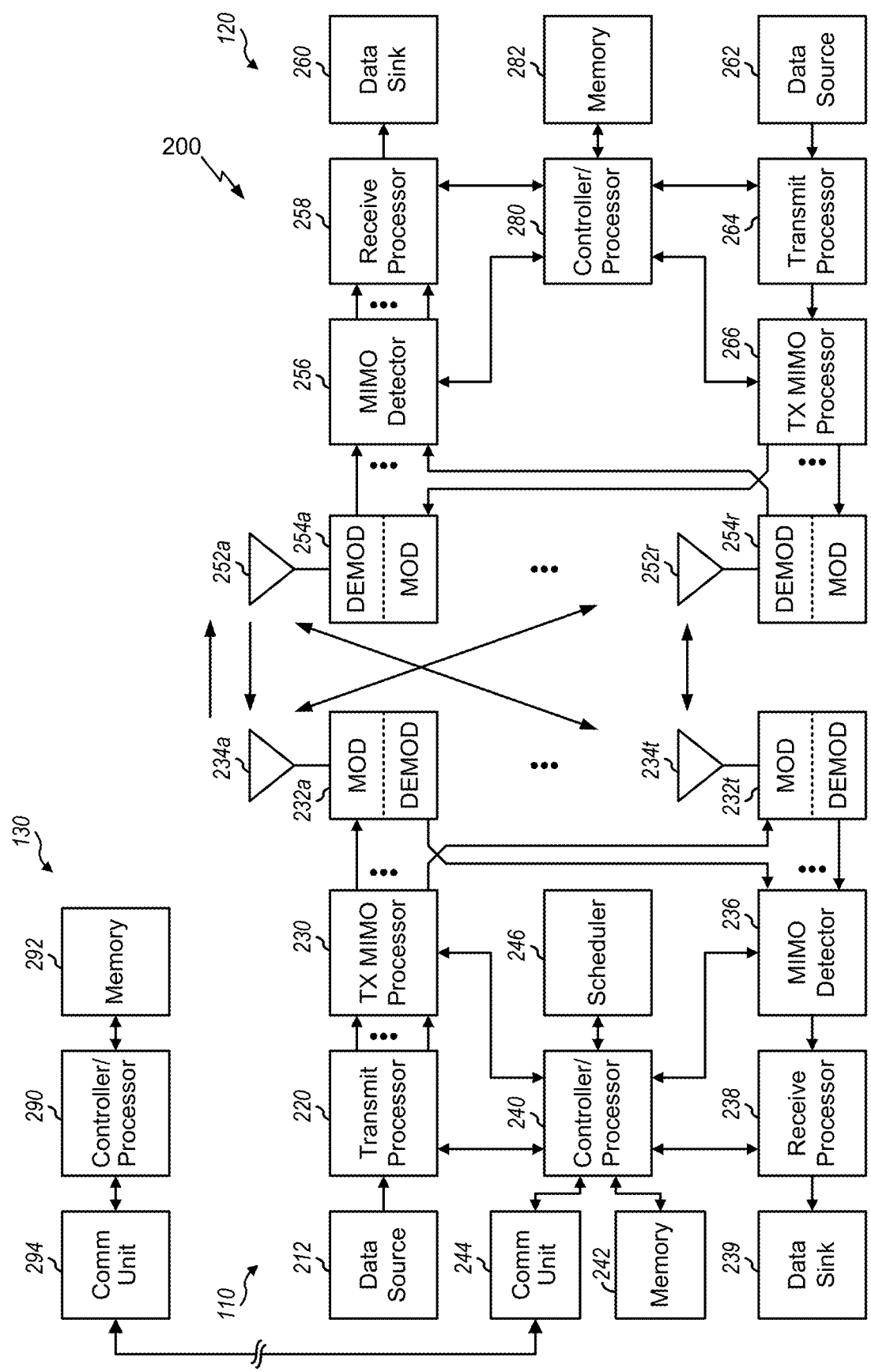
FIG. 2 is a diagram illustrating an example of a base station in communication with a user equipment (UE) in a wireless communication network.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at base station 110 and UE 120, respectively, to configure a common uplink portion of a wireless communication structure in New Radio. For example, controller/processor 280 and/or other processors and modules at base station 110, may perform or direct operations of UE 120 to configure a common uplink portion of a wireless communication structure in New Radio. For example, controller/processor 280 and/or other controllers/processors and modules at BS 110 may perform or direct operations of, for example, process 1200 of FIG. 12 and/or other processes as described herein. In some aspects, one or more of the components shown in FIG. 2 may be employed to perform example process 1200 of FIG. 12 and/or other processes for the techniques described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
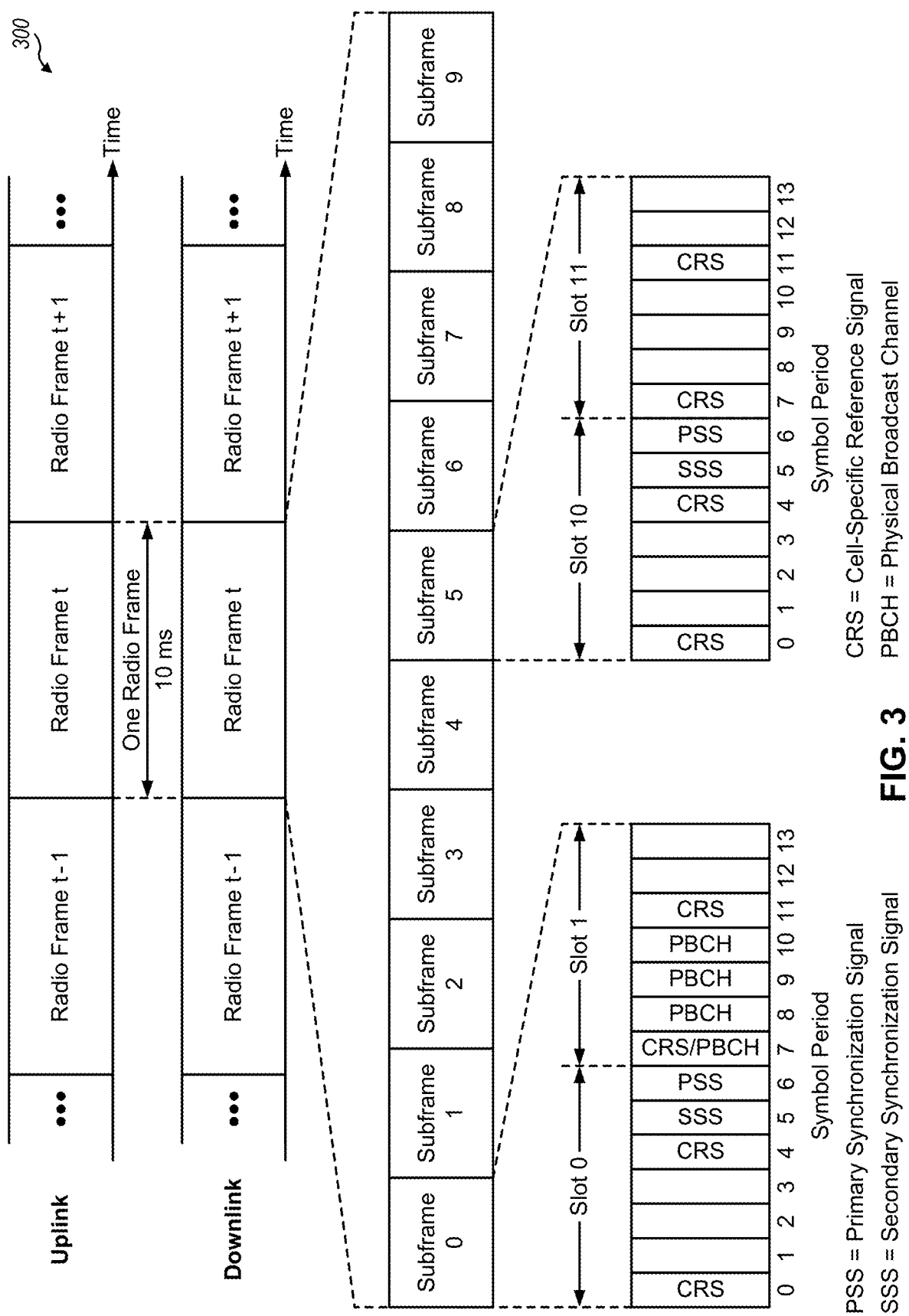
FIG. 3 is a diagram illustrating an example of a frame structure in a wireless communication network.

FIG. 3 shows an example frame structure 300 for FDD in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
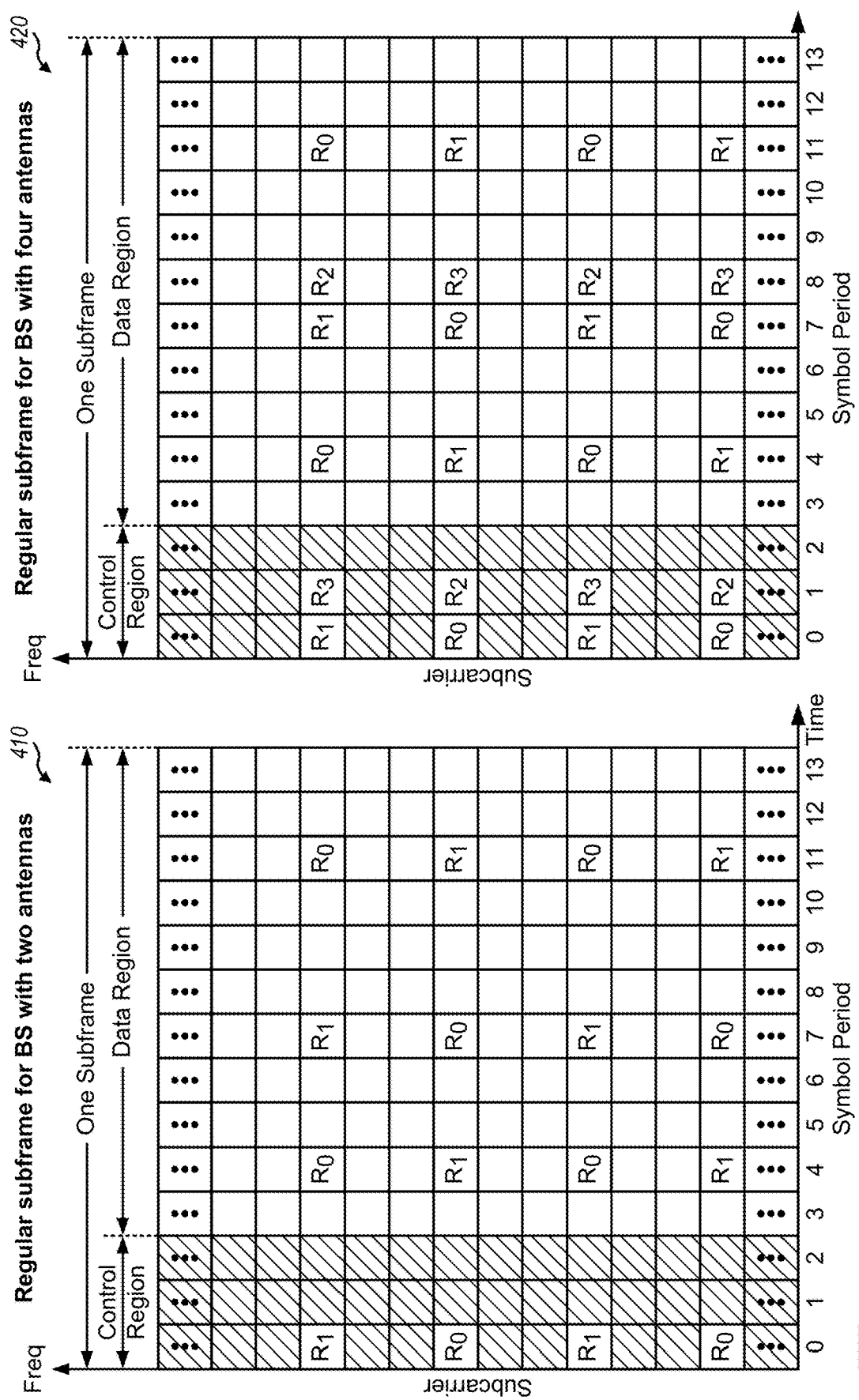
FIG. 4 is a diagram illustrating two example subframe formats with the normal cyclic prefix.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting nonbackward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 7 and 8.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
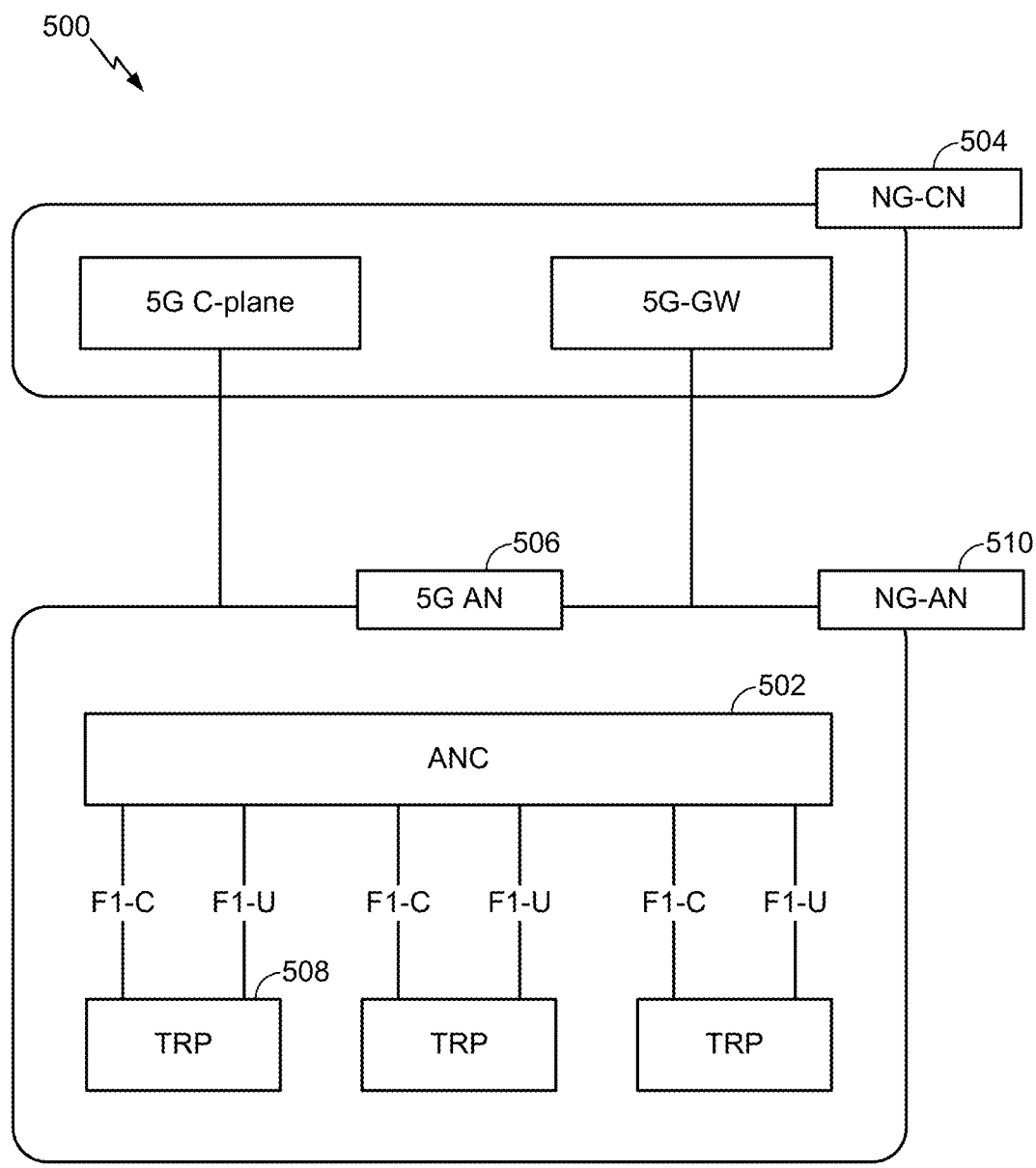
FIG. 5 is a diagram illustrating an example logical architecture of a distributed radio access network (RAN).

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The PDCP, RLC, MAC protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
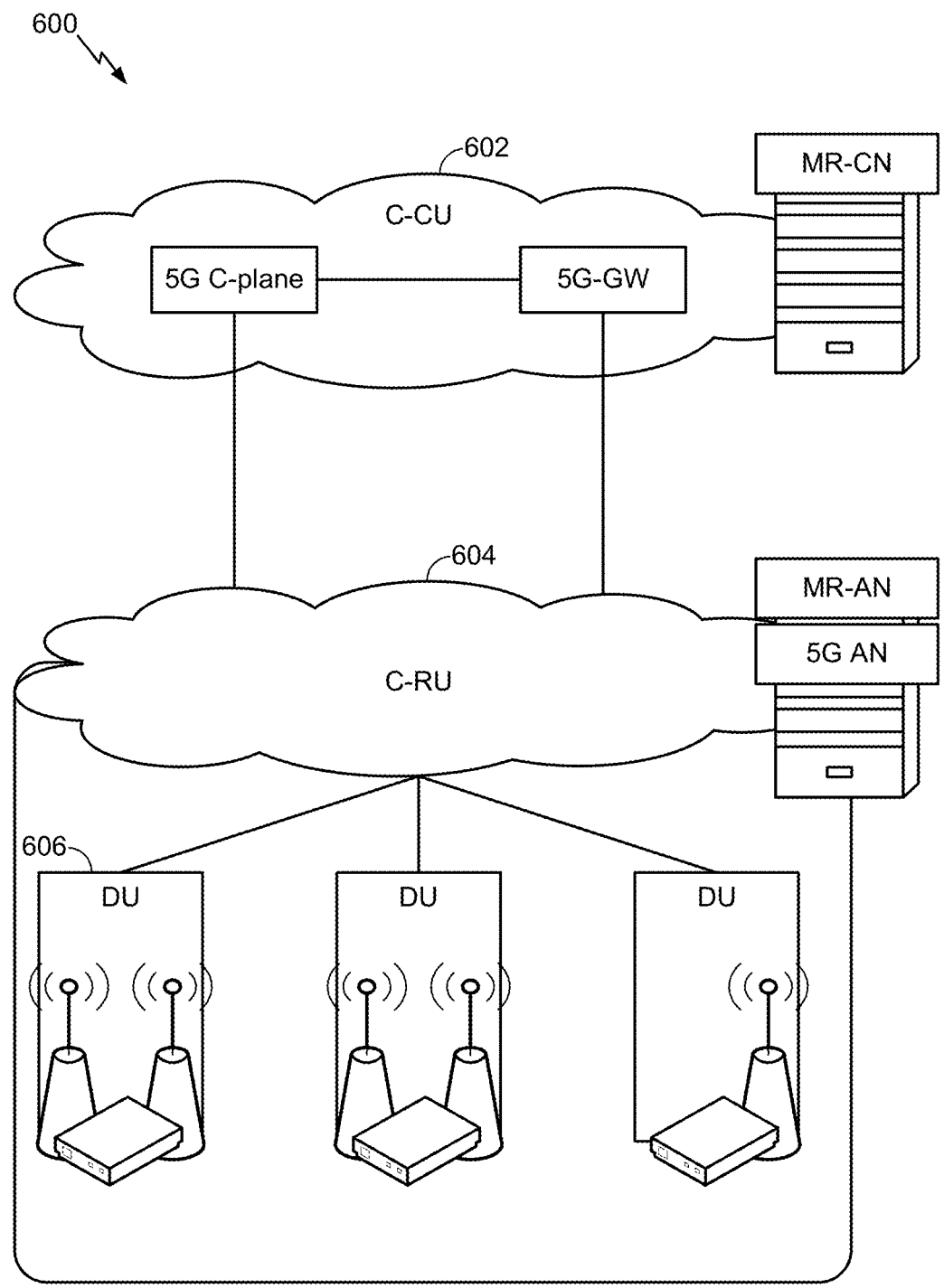
FIG. 6 is a diagram illustrating an example physical architecture of a distributed RAN.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7:
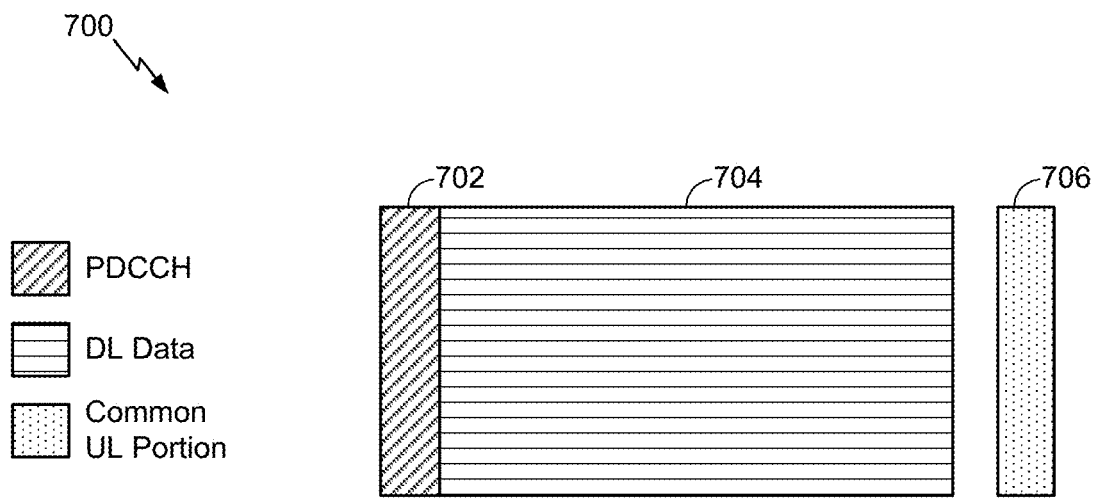
FIG. 7 is a diagram illustrating an example of a downlink (DL)-centric wireless communication structure.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include a common UL portion 706. The common UL portion 706 may sometimes be referred to as a short UL duration, a short UL duration portion, an UL burst, an UL burst portion, a common UL burst, a short burst, an UL short burst, a common UL short burst, a common UL short burst portion, and/or various other suitable terms. In some aspects, the common UL portion 706 may include one or more reference signals. Additionally, or alternatively, the common UL portion 706 may include feedback information corresponding to various other portions of the DL-centric subframe. For example, the common UL portion 706 may include feedback information corresponding to the control portion 702 and/or the data portion 704. Non-limiting examples of information that may be included in the common UL portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The common UL portion 706 may include additional or alternative information, such as information pertaining to random access channel (RACH) procedures, scheduling requests, and various other suitable types of information. Techniques described herein relate to configuring the common UL portion 706 of a wireless communication structure, such as a DL-centric subframe.

As illustrated in FIG. 7, the end of the DL data portion 704 may be separated in time from the beginning of the common UL portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples are possible and may differ from what was described with regard to FIG. 7.

Figure 8:
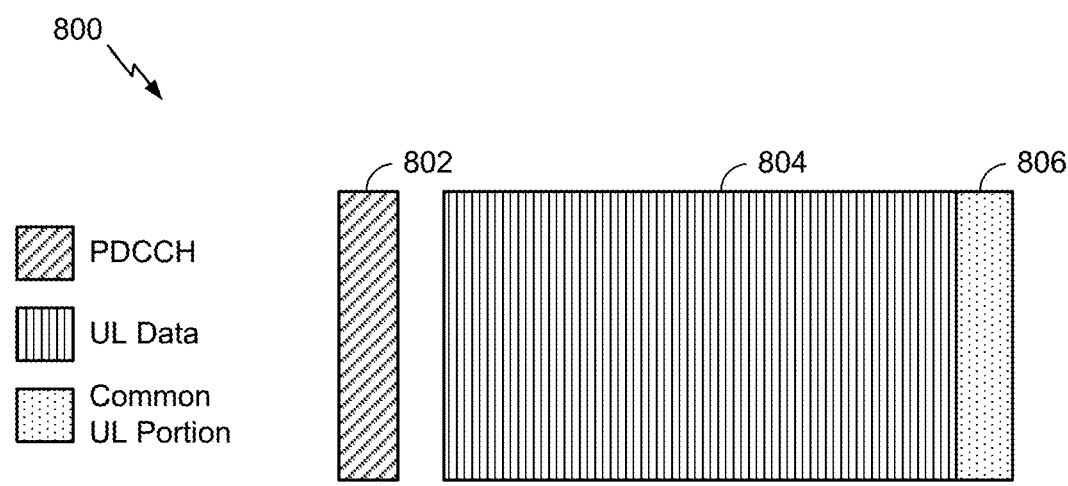
FIG. 8 is a diagram illustrating an example of an uplink (UL)-centric wireless communication structure.

FIG. 8 is a diagram 800 showing an example of an UL-centric subframe or wireless communication structure. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. In some configurations, the control portion 802 may be a physical DL control channel (PDCCH).

The UL-centric subframe may also include an UL data portion 804. The UL data portion 804 may sometimes be referred to as the payload of the UL-centric subframe. The UL portion may refer to the communication resources utilized to communicate UL data from the subordinate entity (e.g., UE) to the scheduling entity (e.g., UE or BS).

As illustrated in FIG. 8, the end of the control portion 802 may be separated in time from the beginning of the UL data portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include a common UL portion 806. The common UL portion 806 in FIG. 8 may be similar to the common UL portion 706 described above with reference to FIG. 7, and may include any of the information described above in connection with FIG. 7. The foregoing is merely one example of an UL-centric wireless communication structure and alternative structures having similar features may exist without necessarily deviating from the aspects described herein. Techniques described herein relate to configuring the common UL portion 806 of a wireless communication structure, such as an UL-centric subframe.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 8 is provided merely as an example. Other examples are possible and may differ from what was described with regard to FIG. 8.

As described above, a wireless communication structure in New Radio may be configured with a common UL portion 706, 806. A UE and/or an eNB may configure the common UL portion 706, 806 with different parameters depending on, for example, a configuration of the UE (e.g., one or more UE capabilities, etc.), a configuration of a cell in which the UE is located, network traffic conditions in the cell, a configuration of the eNB (e.g., one or more eNB capabilities), an amount of data to be communicated to and/or from the UE, a network operator preference, and/or the like. Different configurations of the common UL portion 706, 806 may be preferred in different situations to improve, for example, network latency, throughput, spectral efficiency, network resource utilization, quality of service, usage of computing resources (e.g., processing resources, memory resources, etc.), and/or a user experience. Techniques described herein assist in improving these various factors by configuring the common UL portion 706, 806, as described in more detail below.

Figure 9:
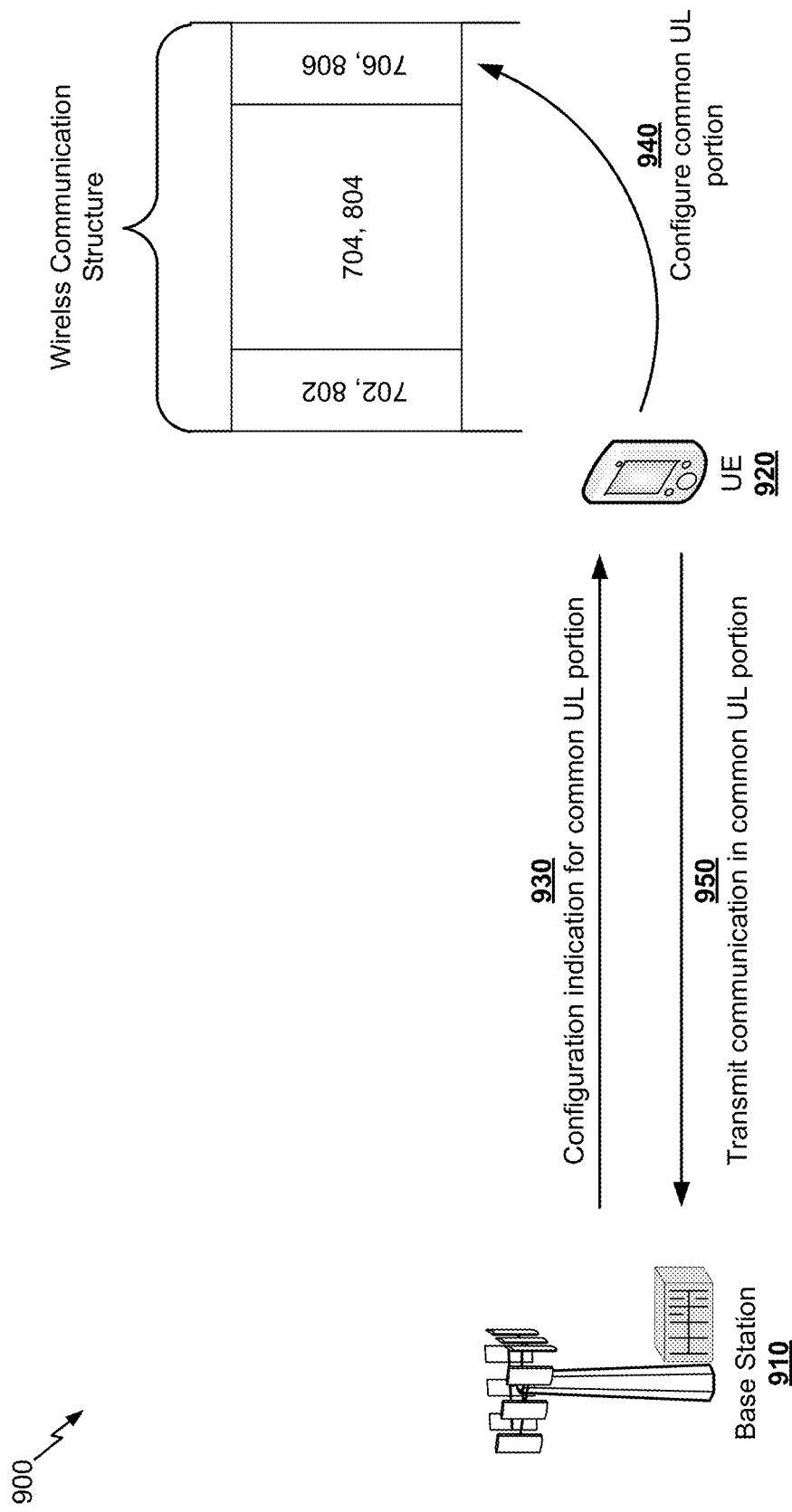

FIG. 9 is a diagram illustrating an example 900 of configuring a common uplink portion of a wireless communication structure in New Radio. As shown, example 900 may include a base station 910 (e.g., the base station 110 of FIG. 1 and/or the like) and a UE 920 (e.g., the UE 120 of FIG. 1 and/or the like).

As shown by reference number 930, the UE 920 may receive, from the base station 910, a configuration indication for a common UL portion 706, 806 of a wireless communication structure. As described in more detail below, the configuration indication may identify one or more parameters for configuring the common UL portion 706, 806. For example, the configuration indication may identify one or more wireless communication structures to be configured according to the configuration indication, a sub-carrier spacing for the common UL portion 706, 806, a number of symbols to be included in the common UL portion 706, 806, a set of resource blocks to be used to transmit the common UL portion 706, 806, a waveform to be used for transmission of the communication in the common UL portion 706, 806, and/or the like. Additionally, or alternatively, the configuration indication may include a configuration index (e.g., one or more bits) that indicate a configuration for one or more parameters for configuring the common UL portion 706, 806. In some aspects, the configuration index may indicate a configuration for at least two of the parameters. In this way, network resources may be conserved by transmitting fewer bits.

In some aspects, the UE 920 may receive the configuration indication using a master information block (MIB) and/or a system information block (SIB). For example, the configuration indication may be included in the MIB. Additionally, or alternatively, the configuration indication may be included in one or more SIBs. In some aspects, the MIB may indicate one or more SIBs that include the configuration indication (e.g., SIB2, SIB3, and/or the like). Additionally, or alternatively, a first SIB or SIBs (e.g., SIB0, SIB1, and/or the like) may indicate a second SIB or SIBs that include the configuration indication (e.g., SIB2, SIB3, and/or the like).

In some aspects, the UE 920 may receive the configuration indication via the PDCCH. For example, the configuration indication may be included in downlink control information (DCI) received via the PDCCH. Additionally, or alternatively, the UE 920 may receive the configuration indication via a physical slot format indicator channel (PSFICH), which may be a downlink control channel that transmits broadcast information.

In some aspects, the UE 920 may receive a first configuration indication at a first time, and may later receive a second configuration indication at a second time. The UE 920 may override a first configuration, indicated by the first configuration indication, with a second configuration indicated by the second configuration indication. For example, the UE 920 may receive the first configuration indication in a MIB and/or a SIB (e.g., upon power up, boot up, connection to a network, and/or the like). The UE 920 may configure the common UL portion 706, 806 based at least in part on the first configuration indication. At a later time, the UE 920 may receive the second configuration indication via a PDCCH, and may configure the common UL portion 706, 806 based at least in part on the second configuration indication, thereby overriding a previous configuration of the common UL portion 706, 806.

In some aspects, the UE 920 may override the entire previous configuration using the second configuration indication. For example, the UE 920 may override a waveform parameter, a timing parameter, a sub-carrier spacing parameter, a length parameter, and a frequency parameter, as described in more detail below in connection with FIG. 10. In some aspects, the UE 920 may override a portion of the previous configuration using the second configuration indication. For example, the UE 920 may override one or more of the waveform parameter, the timing parameter, the sub-carrier spacing parameter, the length parameter, the frequency parameter, and/or the like, while keeping one or more of these parameters intact from the previous configuration.

As shown by reference number 940, the UE 920 may configure the common UL portion 706, 806 of the wireless communication structure based at least in part on the configuration indication. For example, the UE 920 may configure one or more parameters of the common UL portion 706, 805 using a configuration indicated in the configuration indication, as described in more detail elsewhere herein.

As shown by reference number 950, the UE 920 may transmit a communication in the common UL portion 706, 806 configured according to the configuration indication. For example, the UE 920 may transmit the communication based at least in part on a configuration indicated in the configuration indication, as described in more detail elsewhere herein. In this way, the UE 920 may dynamically configure the common UL portion 706, 806 according to a preferred configuration in a particular scenario to improve, for example, network latency, throughput, spectral efficiency, network resource utilization, quality of service, usage of computing resources, a user experience, and/or the like.

As indicated above, FIG. 9 is provided as an example. Other examples are possible and may differ from what was described with respect to FIG. 9.

FIG. 10 is a diagram illustrating another example 1000 of configuring a common uplink portion of a wireless communication structure in New Radio. As shown in FIG. 10, a UE (e.g., UE 120, UE 920, and/or the like) may configure one or more parameters of the common UL portion 706, 806 using a configuration index. The one or more parameters may include, for example, a waveform parameter, a timing parameter, a sub-carrier spacing parameter, a length parameter, a frequency parameter, and/or the like.

As shown by reference number 1010, in some aspects, a configuration indication received by the UE may include a configuration index that indicates one or more values for configuring one or more corresponding parameters of the common UL portion 706, 806. For example, the configuration index may correspond to values for one or more of the waveform parameter, the timing parameter, the sub-carrier spacing parameter, the length parameter, the frequency parameter, and/or the like. While FIG. 10 shows an example of using a configuration index to indicate values of multiple parameters, in some aspects, the configuration indication may include multiple values corresponding to multiple parameters, where the multiple values are not mapped to a configuration index.

As shown by reference number 1020, in some aspects, the UE may receive a configuration indication that indicates a value for configuring the waveform parameter of the common UL portion 706, 806. The value of the waveform parameter may identify a waveform to be used for transmission of one or more communications in the common UL portion 706, 806. As shown, example waveforms include SC-FDM (sometimes referred to as DFT-s-OFDM in New Radio) and OFDM (sometimes referred to as CP-OFDM in New Radio). The UE may configure the waveform of the common UL portion 706, 806 based at least in part on the value of the waveform parameter.

As shown by reference number 1030, in some aspects, the UE may receive a configuration indication that indicates a value for configuring the timing parameter of the common UL portion 706, 806. The value of the timing parameter may identify one or more wireless communication structures that are to be configured according to a configuration indicated by the configuration indication. In some aspects, the timing parameter may instruct the UE to configure a same wireless communication structure (e.g., shown as "slot") in which the configuration indication is received (e.g., indicated in FIG. 10 as "current slot"). For example, the UE may receive the configuration indication via the PDCCH in a control portion 702, 802 at the beginning of a wireless communication structure, and the configuration indication may indicate a configuration to be used for a common UL portion 706, 806 at the end of the same wireless communication structure.

In some aspects, the timing parameter may instruct the UE to configure a wireless communication structure that is one time unit later than the wireless communication structure in which the configuration indication is received (e.g., shown in FIG. 10 as "1 slot away"), that is two time units later than the wireless communication structure in which the configuration indication is received (e.g., shown in FIG. 10 as "2 slots away"), and/or the like. For example, the UE may receive the configuration indication in a first wireless communication structure (e.g., K), and the configuration indication may indicate a configuration to be used for a common UL portion 706, 806 of a second wireless communication structure (e.g., K+1), a third wireless communication structure (e.g., K+2), a fourth wireless communication structure (e.g., K+L), and/or the like.

As shown by reference number 1040, in some aspects, the UE may receive a configuration indication that indicates a value for configuring the sub-carrier spacing parameter of the common UL portion 706, 806. The value of the sub-carrier spacing parameter may identify a sub-carrier spacing for the common UL portion 706, 806. As shown, example sub-carrier spacings include 15 kilohertz (KHz), 30 KHz, 60 KHz, 120 KHz, and/or the like.

As shown by reference number 1050, in some aspects, the UE may receive a configuration indication that indicates a value for configuring the length parameter of the common UL portion 706, 806. The value of the length parameter may identify a number of symbols to be included in the common UL portion 706, 806. As shown, example lengths of the common UL portion 706, 806 include 1 symbol, 2 symbols, 3 symbols, 4 symbols, all symbols in the wireless communication structure (e.g., M symbols, where the wireless communication structure includes a total of M symbols), and/or the like.

As shown by reference number 1060, in some aspects, the UE may receive a configuration indication that indicates a value for configuring the frequency parameter of the common UL portion 706, 806. The value of the frequency parameter may identify a set of resource blocks to be used to transmit one or more communications in the common UL portion 706, 806. As shown, example sets of resource blocks (RBs) include RBs 0-100, RBs 50-150, RBs 100-200, all RBs in the bandwidth allocated to the UE, and/or the like.

In some aspects, as described elsewhere herein, the UE may receive a configuration indication for configuring a common UL portion of a wireless communication structure. In some aspects, the configuration indication may identify at least one of a value of the waveform parameter, a value of the timing parameter, a value of the sub-carrier spacing parameter, a value of the length parameter, and/or a value of the frequency parameter.

Additionally, or alternatively, the configuration indication may include a configuration index that indicates a configuration (e.g., one or more values) for one or more of the parameters described above. In some aspects, the configuration index may indicate a configuration for at least two of the parameters described above. In some aspects, the UE may receive the configuration index, and may use a configuration table stored by the UE, such as the table shown in FIG. 10, to identify a configuration (e.g., one or more values) for the parameter(s). In this way, network resources may be conserved by transmitting fewer bits.

As indicated above, FIG. 10 is provided as an example. Other examples are possible and may differ from what was described with respect to FIG. 10.

FIG. 11 is a diagram illustrating another example 1100 of configuring a common uplink portion of a wireless communication structure in New Radio. As shown in FIG. 11, a UE (e.g., UE 120, UE 920, and/or the like) may configure one or more cell-specific parameters of the common UL portion 706, 806, and/or may configure one or more UE-specific parameters of the common UL portion 706, 806.

As shown by reference number 1110, the UE may configure one or more cell-specific parameters of the common UL portion 706, 806 using a cell-specific configuration indication, such as a cell-specific configuration index and/or one or more values for the one or more cell-specific parameters. A cell-specific parameter may include a parameter that is used to configure all UEs in a cell (e.g., the parameter is the same for all UEs in the cell). The one or more cell-specific parameters may include, for example, a timing parameter, a sub-carrier spacing parameter, a length parameter, and/or the like. These parameters are described in more detail above in connection with FIG. 10.

As shown by reference number 1120, the UE may configure one or more UE-specific parameters of the common UL portion 706, 806 using a UE-specific configuration indication, such as a UE-specific configuration index and/or one or more values for the one or more UE-specific parameters. A UE-specific parameter may include a parameter that is configured differently for different UEs in a cell (e.g., the parameter may be different for different UEs in the cell). The one or more UE-specific parameters may include, for example, a waveform parameter, a frequency parameter, and/or the like. These parameters are described in more detail above in connection with FIG. 10.

In some aspects, the UE may receive the cell-specific configuration indication and/or the UE-specific configuration indication using a MIB and/or a SIB, as described above in connection with FIG. 9. Additionally, or alternatively, the UE may receive the cell-specific configuration indication and/or the UE-specific configuration indication via the PDCCH and/or the PSFICH, as described above in connection with FIG. 9.

In some aspects, the cell-specific configuration indication and the UE-specific configuration indication may be transmitted and/or received together, such as in the same MIB and/or SIB, the same search space of the PDCCH, and/or the like.

In some aspects, the cell-specific configuration indication and the UE-specific configuration indication may be transmitted and/or received differently. For example, the UE may receive the cell-specific configuration indication in a common search space of the PDCCH, and may receive the UE-specific configuration indication in a UE-specific search space of the PDCCH. Additionally, or alternatively, the UE may receive the cell-specific configuration indication via the PSFICH, and may receive the UE-specific configuration indication via the PDCCH. Additionally, or alternatively, the UE may receive the cell-specific configuration indication via the PBCH (e.g., in a MIB and/or SIB), and may receive the UE-specific configuration indication via the PDCCH.

As indicated above, FIG. 11 is provided as an example. Other examples are possible and may differ from what was described with respect to FIG. 11.

Figure 12:
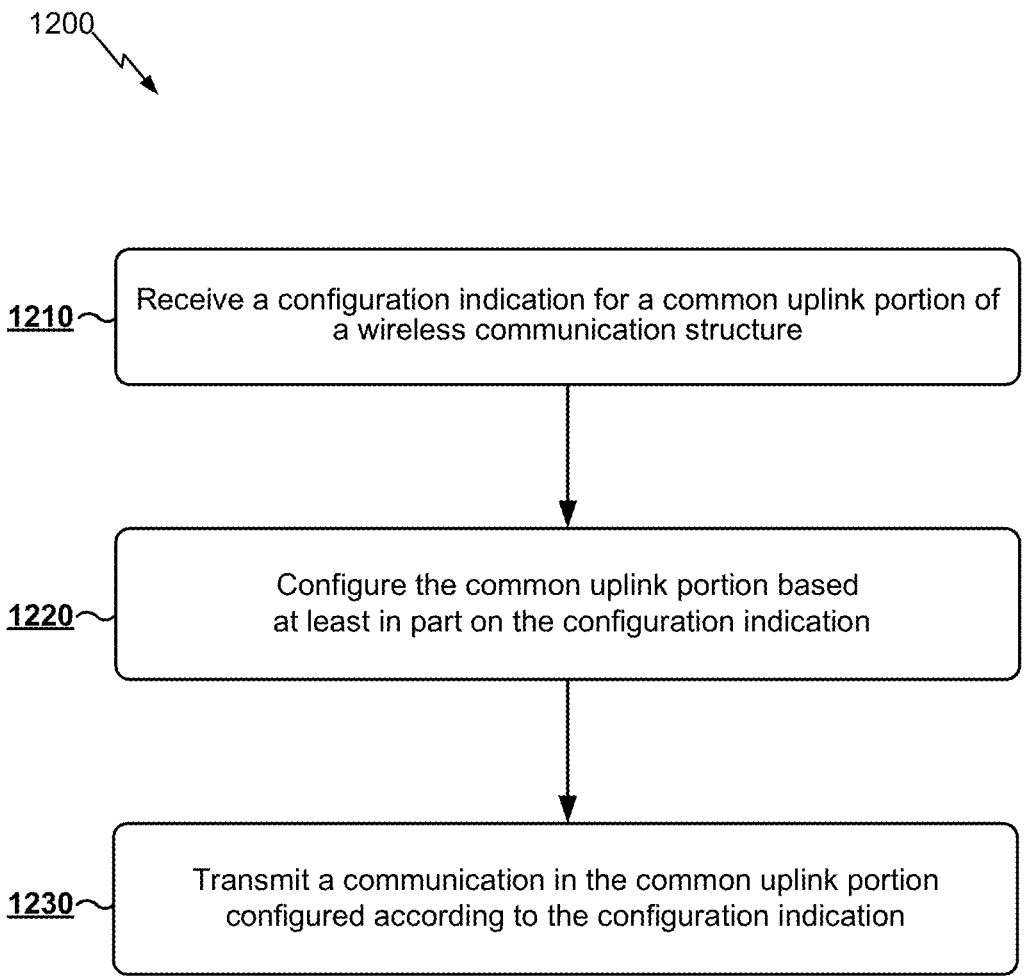
FIG. 12 is a flow chart of a method of wireless communication.

FIG. 12 is a flow chart of a process 1200 of wireless communication. The method may be performed by a UE (e.g., UE 120, UE 920, and/or the like).

At 1210, the UE may receive a configuration indication for a common uplink portion of a wireless communication structure. For example, the UE may receive a configuration indication for configuring a common uplink portion of a wireless communication structure. In some aspects, the configuration indication identifies at least one of: the wireless communication structure to be configured according to the configuration indication, a sub-carrier spacing for the common uplink portion, a number of symbols to be included in the common uplink portion, a set of resource blocks to be used to transmit the common uplink portion, a waveform to be used for transmission of a communication in the common uplink portion, or any combination thereof. In some aspects, the configuration indication includes a configuration index that indicates a configuration for at least two parameters of the common uplink portion, such as at least two of the parameters described above.

In some aspects, the configuration indication identifies a cell-specific configuration for the common uplink portion. For example, the cell-specific configuration may identify at least one of the wireless communication structure to be configured according to the configuration indication, a sub-carrier spacing for the common uplink portion, a number of symbols to be included in the common uplink portion, or any combination thereof.

In some aspects, the configuration indication identifies a UE-specific configuration for the common uplink portion. For example, the UE-specific configuration may identify at least one of a set of resource blocks to be used to transmit the common uplink portion, a waveform to be used for transmission of the communication in the common uplink portion, or any combination thereof.

In some aspects, the configuration indication is received using at least one of a MIB, a SIB, or any combination thereof. In some aspects, the MIB indicates the SIB that includes the configuration indication. In some aspects, the configuration indication is received via the PDCCH.

In some aspects, the configuration indication includes a cell-specific configuration indication that identifies a cell-specific configuration for the common uplink portion and a UE-specific configuration indication that identifies a UE-specific configuration for the common uplink portion. In some aspects, the cell-specific configuration indication is received in a common search space of the PDCCH, and the UE-specific configuration indication is received in a UE-specific search space of the PDCCH. In some aspects, the cell-specific configuration indication is received via the PSFICH, and the UE-specific configuration indication is received via the PDCCH. In some aspects, the cell-specific configuration indication is received via the PBCH, and the UE-specific configuration indication is received via the PDCCH.

At 1220, the UE may configure the common uplink portion based at least in part on the configuration indication. For example, the UE may use the configuration indication to configure at least one of a sub-carrier spacing for the common uplink portion(s) of one or more wireless communication structures indicated by the configuration indication, a number of symbols to be included in the common uplink portion(s) of one or more wireless communication structures indicated by the configuration indication, a set of resource blocks to be used to transmit the common uplink portion(s) of one or more wireless communication structures indicated by the configuration indication, a waveform to be used for transmission of communication(s) in the common uplink portion(s) of one or more wireless communication structures indicated by the configuration indication, or any combination thereof.

In some aspects, the UE may use the configuration indication (e.g., a configuration index) and a configuration table stored by the UE to determine a configuration for the common uplink portion. For example, the UE may configure the common uplink portion based at least in part on identifying a configuration for at least two parameters using the configuration index and the configuration table stored by the UE.

In some aspects, the UE may configure the common uplink portion by overriding a previous configuration of the common uplink portion. For example, the UE may receive a first configuration indication at a first time, and may configure the common uplink portion according to the first configuration indication. At a second time (e.g., a later time), the UE may receive a second configuration indication, and may configure the common uplink portion according to the second configuration indication, thereby overriding a previous configuration indicated by the first configuration indication.

At 1230, the UE may transmit a communication in the common uplink portion configured according to the configuration indication. For example, the UE may transmit a communication in the common uplink portion, which may be configured according to the configuration indication. In some aspects, the UE may transmit the communication in a manner indicated by the configuration indication (e.g., using a waveform, timing, waveform, sub-carrier spacing, length, and/or frequency indicated in the configuration indication). In this way, the UE may configure and/or transmit the common uplink portion according to a preferred configuration in a particular scenario to improve, for example, network latency, throughput, spectral efficiency, network resource utilization, quality of service, usage of computing resources, a user experience, and/or the like.

Although FIG. 12 shows example blocks of a method of wireless communication, in some aspects, the method may include additional blocks, fewer blocks, different blocks, or differently arranged blocks than those shown in FIG. 12. Additionally, or alternatively, two or more blocks shown in FIG. 12 may be performed in parallel.

Figure 13:
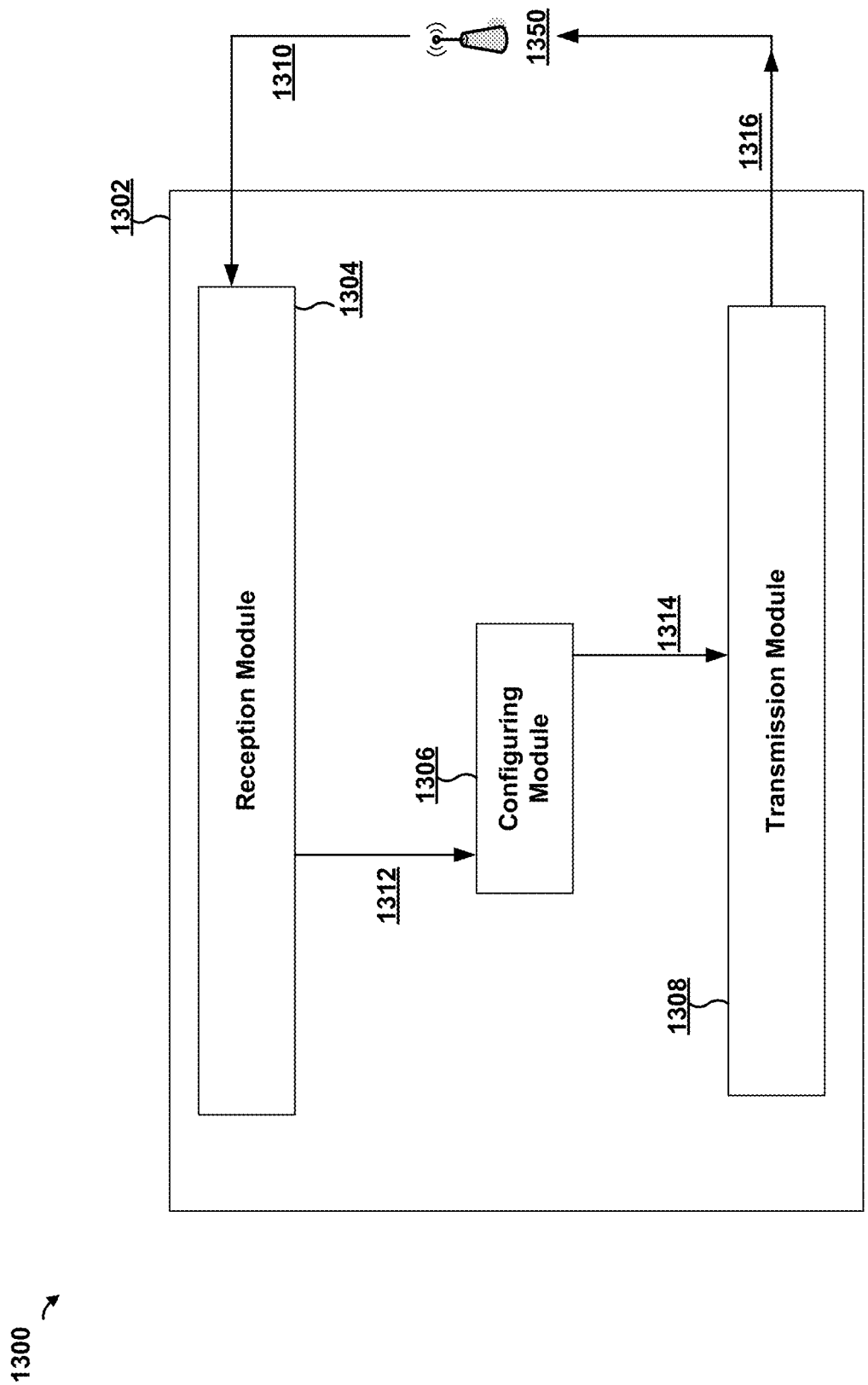
FIG. 13 is a conceptual data flow diagram illustrating the data flow between different modules/means/components in an example apparatus.

FIG. 13 is a conceptual data flow diagram 1300 illustrating the data flow between different modules/means/components in an example apparatus 1302. The apparatus 1302 may be a UE, such as the UE 120, the UE 920, and/or the like. In some aspects, the apparatus 1302 includes a reception module 1304, a configuring module 1306, and/or a transmission module 1308.

The reception module 1304 may receive data 1310 from, for example, a base station 1350, which may correspond to the base station 110 and/or the like. The data 1310 may include, for example, a configuration indication for a common uplink portion of a wireless communication structure. The reception module 1304 may provide the configuration indication, as data 1312, to the configuring module 1306.

The configuring module 1306 may receive the data 1312 (e.g., the configuration indication), and may configure the common uplink portion of the wireless communication structure based at least in part on the configuration indication. The configuring module 1306 may provide, to the transmission module 1308 as data 1314, information that identifies a configuration of the common uplink portion.

The transmission module 1308 may use the configuration of the common uplink portion to transmit one or more communications using the common uplink portion. For example, the transmission module 1308 may transmit the one or more communications to the base station 1350 as data 1316.

The apparatus may include additional modules that perform each of the blocks of the algorithm in the aforementioned flow chart of FIG. 12. As such, each block in the aforementioned flow chart of FIG. 12 may be performed by a module, and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 13 are provided as an example. In practice, there may be additional modules, fewer modules, different modules, or differently arranged modules than those shown in FIG. 13. Furthermore, two or more modules shown in FIG. 13 may be implemented within a single module, or a single module shown in FIG. 13 may be implemented as multiple, distributed modules. Additionally, or alternatively, a set of modules (e.g., one or more modules) shown in FIG. 13 may perform one or more functions described as being performed by another set of modules shown in FIG. 13.

Figure 14:
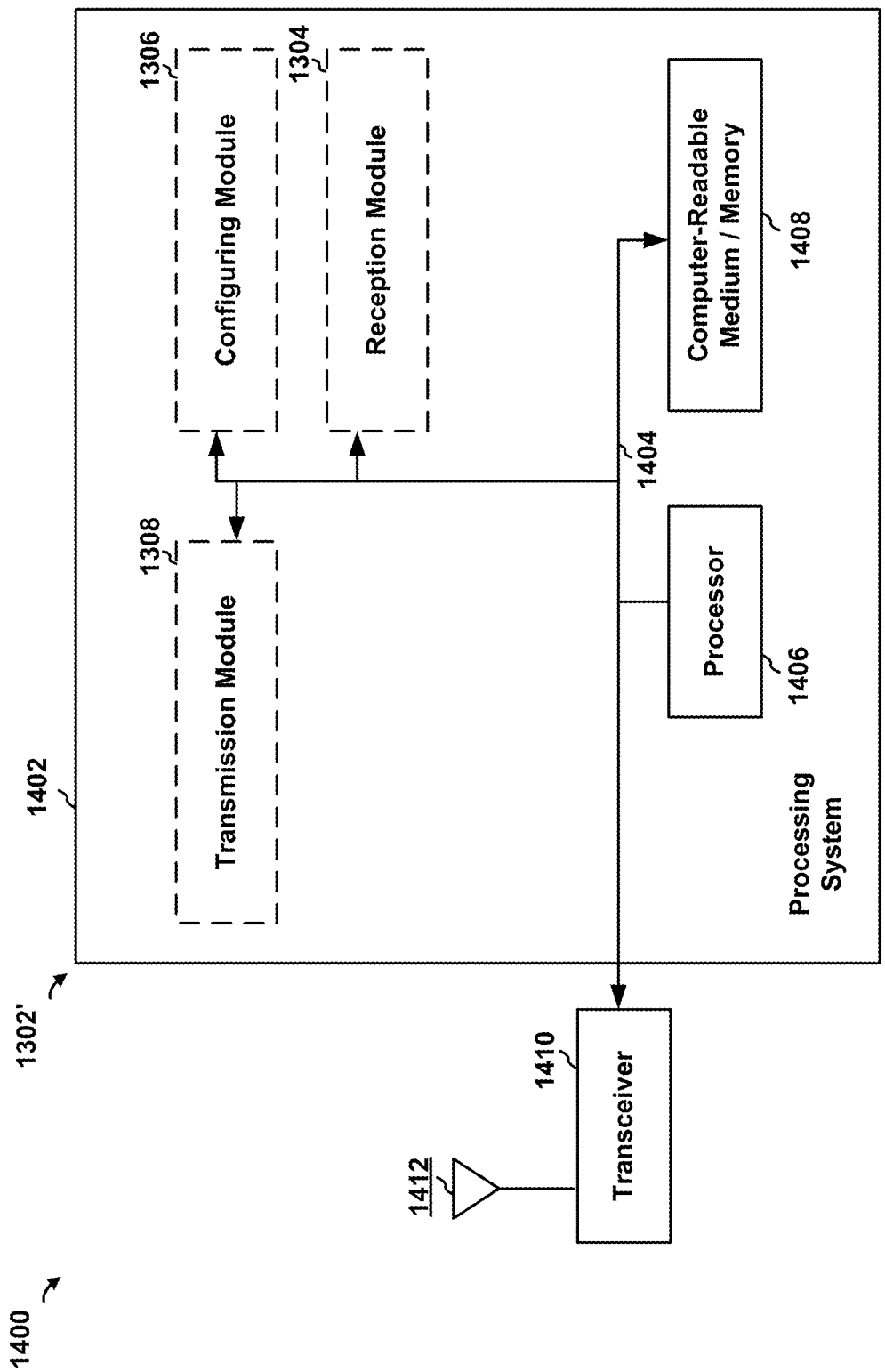
FIG. 14 is a diagram illustrating an example of a hardware implementation for an apparatus employing a processing system.

FIG. 14 is a diagram 1400 illustrating an example of a hardware implementation for an apparatus 1302' employing a processing system 1402. The apparatus 1302' may be a UE, such as the UE 120, the UE 920, and/or the like.

The processing system 1402 may be implemented with a bus architecture, represented generally by the bus 1404. The bus 1404 may include any number of interconnecting buses and bridges depending on the specific application of the processing system 1402 and the overall design constraints. The bus 1404 links together various circuits including one or more processors and/or hardware modules, represented by the processor 1406, the modules 1304, 1306, 1308, and the computer-readable medium/memory 1408. The bus 1404 may also link various other circuits such as timing sources, peripherals, voltage regulators, and power management circuits, which are well known in the art, and therefore, will not be described any further.

The processing system 1402 may be coupled to a transceiver 1410. The transceiver 1410 is coupled to one or more antennas 1412. The transceiver 1410 provides a means for communicating with various other apparatus over a transmission medium. The transceiver 1410 receives a signal from the one or more antennas 1412, extracts information from the received signal, and provides the extracted information to the processing system 1402, specifically the reception module 1304. In addition, the transceiver 1410 receives information from the processing system 1402, specifically the transmission module 1308, and based at least in part on the received information, generates a signal to be applied to the one or more antennas 1412. The processing system 1402 includes a processor 1406 coupled to a computer-readable medium/memory 1408. The processor 1406 is responsible for general processing, including the execution of software stored on the computer-readable medium/memory 1408. The software, when executed by the processor 1406, causes the processing system 1402 to perform the various functions described supra for any particular apparatus. The computer-readable medium/memory 1408 also be used for storing data that is manipulated by the processor 1406 when executing software. The processing system further includes at least one of the modules 1304, 1306, 1308. The modules may be software modules running in the processor 1406, resident/stored in the computer-readable medium/memory 1408, one or more hardware modules coupled to the processor 1406, or some combination thereof. The processing system 1402 may be a component of the UE 120 and may include the memory 282 and/or at least one of the TX MIMO processor 266, the RX processor 258, and/or the controller/processor 280.

In some aspects, the apparatus 1302/1302' for wireless communication includes means for receiving a configuration indication for a common uplink portion of a wireless communication structure, means for configuring the common uplink portion based at least in part on the configuration indication, and/or means for transmitting a communication in the common uplink portion configured according to the configuration indication. The aforementioned means may be one or more of the aforementioned modules of the apparatus 1302 and/or the processing system 1402 of the apparatus 1302' configured to perform the functions recited by the aforementioned means. As described supra, the processing system 1402 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

FIG. 14 is provided as an example. Other examples are possible and may differ from what was described in connection with FIG. 14.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
receiving, by a user equipment (UE), a configuration indication for a common uplink portion of a wireless communication structure,
wherein the configuration indication includes at least a configuration index that indicates a plurality of parameters for configuring the common uplink portion,
wherein the plurality of parameters comprise:
one or more values for a length parameter, of the plurality of parameters, wherein the length parameter identifies a number of symbols to be included in the common uplink portion, and
one or more values for a frequency parameter, of the plurality of parameters, wherein the frequency parameter identifies a set of resource blocks to be used to transmit the common uplink portion, and
wherein the configuration indication for the common uplink portion includes information associated with a Physical Uplink Control Channel (PUCCH);
configuring, by the UE, the common uplink portion based at least in part on the length parameter, and the frequency parameter; and
transmitting, by the UE, a feedback communication in the common uplink portion, wherein the common uplink portion is configured according to the configuration index.

2. The method of claim 1,
wherein the plurality of parameters include at least three parameters, and
wherein the at least three parameters include the length parameter and the frequency parameter.

3. The method of claim 1, wherein configuring the common uplink portion comprises configuring the common uplink portion based at least in part on identifying the configuration for the plurality of parameters using the configuration index and a configuration table stored by the UE.

4. The method of claim 1, wherein the configuration indication identifies a cell-specific configuration for the common uplink portion.

5. The method of claim 4, wherein the cell-specific configuration identifies the wireless communication structure to be configured according to the configuration indication.

6. The method of claim 1, wherein the configuration indication identifies a UE-specific configuration for the common uplink portion.

7. The method of claim 6, wherein the UE-specific configuration identifies at least one of:
the set of resource blocks to be used to transmit the common uplink portion, or
a waveform to be used for transmission of the feedback communication in the common uplink portion.

8. The method of claim 1, wherein the configuration indication is received using a system information block (SIB).

9. The method of claim 8, wherein a master information block (MIB) indicates that the SIB includes the configuration indication.

10. The method of claim 1, wherein the configuration indication is received via a physical downlink control channel (PDCCH).

11. The method of claim 1, wherein configuring the common uplink portion comprises overriding a previous configuration of the common uplink portion.

12. The method of claim 1, wherein the configuration indication includes a cell-specific configuration indication that identifies a cell-specific configuration for the common uplink portion and a UE-specific configuration indication that identifies a UE-specific configuration for the common uplink portion.

13. The method of claim 12, wherein the cell-specific configuration indication is received in a common search space of a physical downlink control channel (PDCCH) and the UE-specific configuration indication is received in a UE-specific search space of the PDCCH.

14. The method of claim 12, wherein the cell-specific configuration indication is received via a physical slot format indicator channel (PSFICH) and the UE-specific configuration indication is received via a physical downlink control channel (PDCCH).

15. The method of claim 12, wherein the cell-specific configuration indication is received via a physical broadcast channel (PBCH) and the UE-specific configuration indication is received via a physical downlink control channel (PDCCH).

16. A user equipment (UE) for wireless communication, comprising:
memory; and
one or more processors operatively coupled to the memory, the one or more processors configured to:
receive a configuration indication for a common uplink portion of a wireless communication structure,
wherein the configuration indication includes at least a configuration index that indicates a plurality of parameters for configuring the common uplink portion,
wherein the plurality of parameters comprise:
one or more values for a length parameter, of the plurality of parameters, wherein the length parameter identifies a number of symbols to be included in the common uplink portion, and
one or more values for a frequency parameter, of the plurality of parameters, wherein the frequency parameter identifies a set of resource blocks to be used to transmit the common uplink portion, and
wherein the configuration indication for the common uplink portion includes information associated with a Physical Uplink Control Channel (PUCCH);
configure the common uplink portion based at least in part on the length parameter, and the frequency parameter; and
transmit a feedback communication in the common uplink portion, wherein the common uplink portion is configured according to the configuration index.

17. The UE of claim 16,
wherein the plurality of parameters include at least three parameters, and
wherein the at least three parameters include the length parameter and the frequency parameter.

18. The UE of claim 16, wherein the configuration indication identifies a cell-specific configuration for the common uplink portion.

19. The UE of claim 18, wherein the cell-specific configuration identifies the wireless communication structure to be configured according to the configuration indication.

20. The UE of claim 16, wherein the configuration indication identifies a UE-specific configuration for the common uplink portion.

21. The UE of claim 20, wherein the UE-specific configuration identifies at least one of:
the set of resource blocks to be used to transmit the common uplink portion, or
a waveform to be used for transmission of the feedback communication in the common uplink portion.

22. The UE of claim 16, wherein configuring the common uplink portion comprises overriding a previous configuration of the common uplink portion.

23. The UE of claim 16, wherein the configuration indication includes a cell-specific configuration indication that identifies a cell-specific configuration for the common uplink portion and a UE-specific configuration indication that identifies a UE-specific configuration for the common uplink portion.

24. The UE of claim 23, wherein the cell-specific configuration indication is received in a common search space of a physical downlink control channel (PDCCH) and the UE-specific configuration indication is received in a UE-specific search space of the PDCCH.

25. The UE of claim 23, wherein the cell-specific configuration indication is received via a physical slot format indicator channel (PSFICH) and the UE-specific configuration indication is received via a physical downlink control channel (PDCCH).

26. The UE of claim 23, wherein the cell-specific configuration indication is received via a physical broadcast channel (PBCH) and the UE-specific configuration indication is received via a physical downlink control channel (PDCCH).

27. A non-transitory computer-readable medium storing instructions for wireless communication, the instructions comprising:
one or more instructions that, when executed by one or more processors of a user equipment (UE), cause the one or more processors to:
receive a configuration indication for a common uplink portion of a wireless communication structure,
wherein the configuration indication includes at least a configuration index that indicates a plurality of parameters for configuring the common uplink portion,
wherein the plurality of parameters comprise:
one or more values for a length parameter, of the plurality of parameters, wherein the length parameter identifies a number of symbols to be included in the common uplink portion, and
one or more values for a frequency parameter, of the plurality of parameters, wherein the frequency parameter identifies a set of resource blocks to be used to transmit the common uplink portion, and
wherein the configuration indication for the common uplink portion includes information associated with a Physical Uplink Control Channel (PUCCH);
configure the common uplink portion based at least in part on the length parameter, and the frequency parameter; and
transmit a feedback communication in the common uplink portion, wherein the common uplink portion is configured according to the configuration index.

28. An apparatus for wireless communication, comprising:
means for receiving a configuration indication for a common uplink portion of a wireless communication structure,
wherein the configuration indication includes at least a configuration index that indicates a plurality of parameters for configuring the common uplink portion,
wherein the plurality of parameters comprise:
one or more values for a length parameter, of the plurality of parameters, wherein the length parameter identifies a number of symbols to be included in the common uplink portion, and
one or more values for a frequency parameter, of the plurality of parameters, wherein the frequency parameter identifies a set of resource blocks to be used to transmit the common uplink portion, and
wherein the configuration indication for the common uplink portion includes information associated with a Physical Uplink Control Channel (PUCCH);
means for configuring the common uplink portion based at least in part on the length parameter, and the frequency parameter; and
means for transmitting a feedback communication in the common uplink portion, wherein the common uplink portion is configured according to the configuration index.

29. The UE of claim 16, wherein, when configuring the common uplink portion, the one or more processors are configured to:
configure the common uplink portion based at least in part on identifying the configuration for the plurality of parameters using the configuration index and a configuration table stored by the UE.

30. The UE of claim 16, wherein the configuration indication is received using a system information block (SIB).

31. The UE of claim 16,
wherein the configuration index is in a table,
wherein the one or more values for the length parameter include a first value, in the table, for the length parameter,
wherein the one or more values for the frequency parameter include a second value, in the table, for the frequency parameter, and
wherein the configuration index, in the table, corresponds to:
the first value, in the table, for the length parameter, and
the second value, in the table, for the frequency parameter.

32. The UE of claim 16,
wherein the configuration index is in a first section of a table,
wherein the table further includes:
a second section, of the table, that corresponds to the length parameter, and
a third section, of the table, that corresponds to the frequency parameter, and
wherein the one or more values for the length parameter include a first value for the length parameter,
wherein the one or more values for the frequency parameter include a second value for the frequency parameter, and
wherein a first position of the configuration index in the first section of the table corresponds to a second position of the first value for the length parameter in the second section of the table and a third position of the second value for the frequency parameter in the third section.

\* \* \* \* \*